(12) United States Patent
Uchiuzo et al.

(10) Patent No.: US 9,061,389 B2
(45) Date of Patent: Jun. 23, 2015

(54) WORKING UNIT

(75) Inventors: Hideki Uchiuzo, Namerikawa (JP);
Minoru Ihara, Uozu (JP)

(73) Assignee: SUGINO MACHINE LIMITED,
Toyama (JP)

( * ) Notice: Subject to any disclaimer, the term of this patent is extended or adjusted under 35 U.S.C. 154(b) by 1074 days.

(21) Appl. No.: 13/041,946

(22) Filed: Mar. 7, 2011

(65) Prior Publication Data

US 2011/0222976 A1 Sep. 15, 2011

(30) Foreign Application Priority Data

Mar. 12, 2010 (JP) ................................. 2010-055695

(51) Int. Cl.
*B23Q 11/10* (2006.01)
*B23B 31/20* (2006.01)
*B23B 51/06* (2006.01)
*B23B 51/04* (2006.01)

(52) U.S. Cl.
CPC ......... *B23Q 11/1015* (2013.01); *Y10T 408/455* (2015.01); *B23Q 11/1092* (2013.01); *B23Q 11/1061* (2013.01); *Y10T 408/45* (2015.01); *Y10T 409/304032* (2015.01); *Y10T 279/17111* (2015.01); *B23B 51/06* (2013.01); *B23B 51/042* (2013.01); *B23B 31/20* (2013.01); *B23B 2231/24* (2013.01); *B23Q 11/103* (2013.01)

(58) Field of Classification Search
CPC ............. B23Q 11/103; B23Q 11/1061; B23Q 11/1092; B23B 51/06; B23B 51/042
USPC .......... 408/56, 57, 130; 409/135, 136; 279/20
See application file for complete search history.

(56) References Cited

U.S. PATENT DOCUMENTS

| | | | | |
|---|---|---|---|---|
| 1,227,564 A | * | 5/1917 | Andersson | 279/20 |
| 2,777,702 A | * | 1/1957 | Rodal | 279/20 |
| 3,024,030 A | * | 3/1962 | Koch | 279/20 |
| 3,364,800 A | * | 1/1968 | Benjamin et al. | 408/239 R |
| 3,791,660 A | * | 2/1974 | Bostley | 279/20 |
| 5,758,995 A | * | 6/1998 | Sahm | 408/57 |
| 6,808,342 B2 | * | 10/2004 | Kress et al. | 409/136 |

(Continued)

FOREIGN PATENT DOCUMENTS

| DE | 4445232 A1 | * | 6/1996 | ............. B23B 31/36 |
|---|---|---|---|---|
| EP | 332328 A1 | * | 9/1989 | ............. B23Q 11/10 |

(Continued)

*Primary Examiner* — Daniel Howell
*Assistant Examiner* — Chwen-Wei Su
(74) *Attorney, Agent, or Firm* — Oliff PLC

(57) ABSTRACT

To provide a working unit ejecting mist of the excellent quality. A working unit includes a body, a ram, a forward and backward moving mechanism moving the ram forward and backward, a tool, a holding section holding the tool and moving forward and backward integrally with the ram, a spindle motor rotating the holding section, and a mist supply portion supplying mist mixed with air and cutting oil to the tool and works a workpiece while supplying the mist. The tool has through-holes supplying the mist to a cutting blade portion. The holding section includes a collet holding the tool and a collet holder having an inner cylindrical portion into which the collet is inserted with a communication hole to which the mist supplied from the mist supply portion 10 is introduced being formed from the inner cylindrical portion to an outer peripheral portion. A flow path guide plug having a mist supply path formed from an inner opening end of the communication hole toward the through-holes of the tool is internally fitted to the inner cylindrical portion.

7 Claims, 8 Drawing Sheets

(56) References Cited

U.S. PATENT DOCUMENTS

| | | | |
|---|---|---|---|
| 8,360,695 B2* | 1/2013 | Haenle | 408/57 |
| 2003/0152431 A1* | 8/2003 | Jansen | 408/56 |
| 2003/0202852 A1* | 10/2003 | Born | 408/130 |
| 2007/0177953 A1* | 8/2007 | Matsumura et al. | 409/136 |
| 2008/0185793 A1* | 8/2008 | Haimer et al. | 279/2.06 |
| 2011/0070042 A1* | 3/2011 | Saito et al. | 408/59 |

FOREIGN PATENT DOCUMENTS

| | | | | |
|---|---|---|---|---|
| EP | 1188514 A1 * | 3/2002 | | B23Q 11/12 |
| JP | S6353647 U * | 4/1988 | | B23Q 11/10 |
| JP | A-11-320327 | 11/1999 | | |
| JP | A-2002-178207 | 6/2002 | | |
| JP | A-2006-316801 | 11/2006 | | |
| JP | A-2008-207290 | 9/2008 | | |
| WO | WO 2008/146957 A1 * | 12/2008 | | B23Q 3/12 |

\* cited by examiner

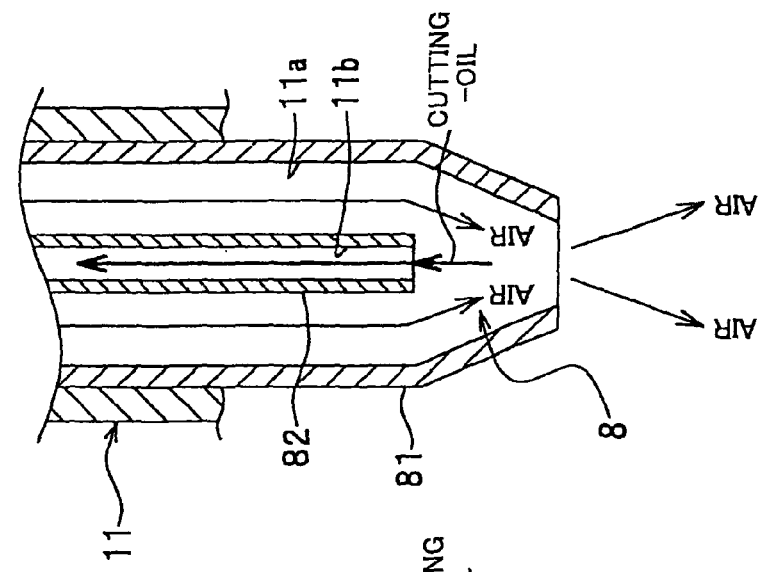
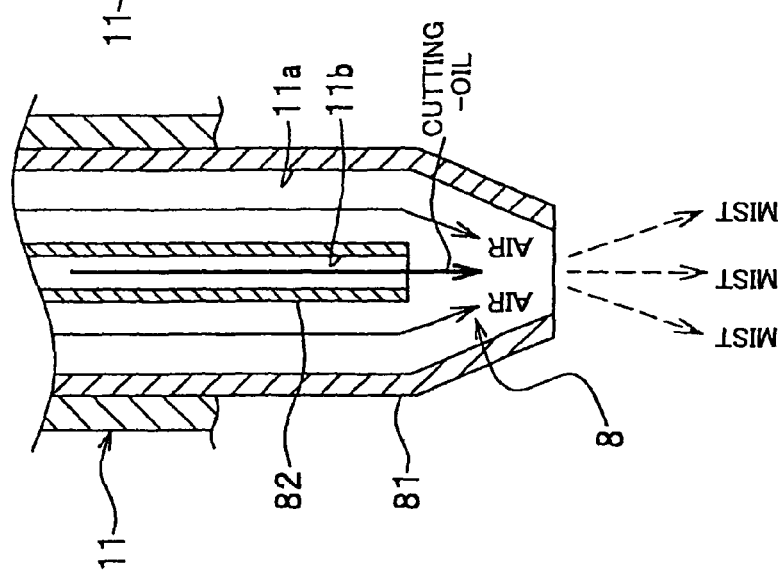

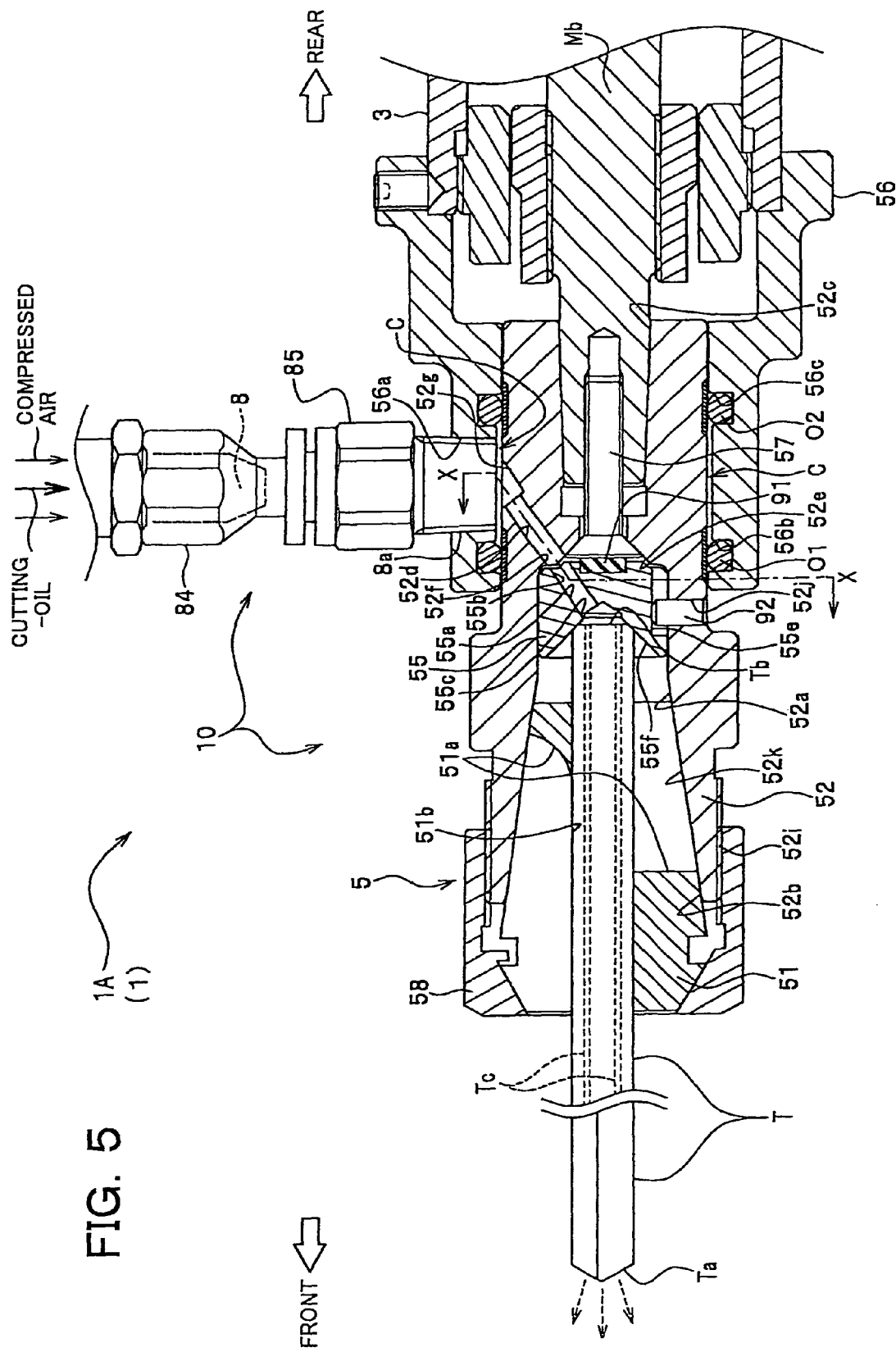

WORKING UNIT

BACKGROUND OF THE INVENTION

1. Field of the Invention

The present invention relates to a working unit, working device working a workpiece using mist generated by mixing air and cutting oil.

2. Description of the Related Art

Conventionally, in cutting work or grinding work, with respect to the method for supplying cutting oil (coolant) to a workpiece and a tool, there have been two kinds in general of a method of supplying the cutting oil through a space arranged inside a machine tool or a drilling unit (so-called center-through and spindle-through) and a method of supplying the cutting oil from a cutting oil supply unit arranged outside (so-called side-through and side fluid supply).

With respect to the center-through and spindle-through unit, two types are known, they are, one type blowing the foggy mist which is the mixture of the cutting oil and air to the tool and workpiece from behind the working unit in order to reduce friction, to lower the cost and the like, and another type respectively supplying the cutting oil and air from behind the working unit through the spindle and the outer periphery and the side of the spindle and blowing them to the tool and workpiece (for example, refer to Japanese Published Unexamined Patent Application Nos. 2006-316801 (refer to claim 1 and FIG. 1) and H11-320327 (refer to claim 1 and FIGS. 1, 2)).

Also, with respect to the side-through and side fluid supplying unit, a type connecting a cooling mist supply unit to the side of the tool at the leading end of the working unit in order to facilitate replacement of the tool, to improve working accuracy and the like and blowing the mist to the tool and workpiece is known (for example, refer to Japanese Published Unexamined Patent Application Nos. 2002-178207 (refer to claim 1 and FIG. 5) and 2008-207290 (refer to FIG. 1)).

However, in the past, in a drilling unit of a construction in which the center-through and spindle-through types could not be adopted, the side-through system was adopted. At that time, when there were a number of positions where the mist collided with the wall surface of the drilling unit, when the mist was hard to enter into a through-hole of a drill, or when the space volume inside a flow path where the mist flowed changed largely, there was a case that the mist was liquefied, the cutting oil accumulated inside, and only the air was ejected from the tip of the drill.

In this case, when a predetermined amount or more of the cutting oil was stored inside the drilling unit, there was a problem that the liquid of the cutting oil liquefied from the mist was intermittently discharged from the tip of the drill.

SUMMARY OF THE INVENTION

Accordingly, the present invention has been developed in order to solve such problems, and an object of the present invention is to provide a working unit, working device that allows ejection of the mist of the excellent quality from the tip of a tool.

In order to address the above-described problems, according to a first aspect of the present invention, a working unit, working device for working a workpiece using mist for working includes a generally cylindrical body, a ram provided inside the body so that the ram can move forward and backward therein, a forward and backward moving mechanism moving the ram forward and backward, a tool for working the workpiece, a holding section holding the tool and moving forward and backward integrally with the ram, a spindle motor rotating the holding section, and a mist supply portion supplying foggy mist generated by mixing air from an air supply section supplying the air and cutting oil from an oil supply unit supplying the cutting oil to the tool, in which the tool has through-holes supplying the mist to a cutting blade portion, the holding section includes a collet holding the tool and a collet holder having an inner cylindrical portion into which the collet is inserted with a communication hole to which the mist supplied from the mist supply portion is introduced being formed from the inner cylindrical portion to an outer peripheral portion, and a flow path guide plug having a mist supply path formed from an inner opening end of the communication hole toward the through-holes of the rear end surface of the tool is internally fitted to the inner cylindrical portion.

According to such a configuration, in the working unit, a communication hole to which the mist is introduced is formed in the collet holder having the inner cylindrical portion into which the collet holding the tool is inserted from the inner cylindrical portion to the outer peripheral portion. The flow path guide plug having the mist supply path formed from the inner opening end of the communication hole toward the through-holes of the rear end surface of the tool is internally fitted to the inner cylindrical portion, the communication hole and the mist supply path communicate with each other to allow the mist to flow directly toward the through-holes of the tool. Thus, the mist supplied to the communication hole of the collet holder flows straight to the through-holes of the tool through the mist supply path of the flow path guide plug and directly enters the through-holes, and therefore smooth injection from the tip surface of the tool is allowed. As a result of it, the working unit can work while ejecting the mist of the excellent quality, and the workpiece can be finished smoothly with the excellent surface roughness.

According to a second aspect of the present invention, in the working unit, the communication hole may be formed diagonal with respect to the axial direction from an outer opening end formed on the outer peripheral surface of the collet holder toward the inner opening end, the mist supply path may be formed diagonal with respect to the axial direction through an upstream side opening end and a downstream side opening end toward the through-holes of the rear end surface of the tool, and the flow path guide plug may be arranged so that the mist having entered an outer opening end continuously flows from the communication hole to the through-holes of the tool through the mist supply path.

According to such a configuration, the communication hole and the mist supply path are formed diagonal with respect to the axial direction from the upstream side opening end toward the downstream side opening end, and are arranged so that the mist having entered the outer opening end of the communication hole continuously flows from the communication hole to the through-holes of the tool through the mist supply path. Thus, the mist supplied to the communication hole of the collet holder is allowed to flow straight toward the through-holes of the tool via the shortest distance, and collision of the mist with the inner wall and the like of the flow path can be minimized as much as possible. As a result of it, in the communication hole and the mist supply path, the flowing resistance of the mist flowing through the flow path inside the holding section can be reduced to make the flow smooth, and the mist can be supplied into the tool while maintaining an excellent foggy state.

Also, because the mist supply path of the flow path guide plug inserted into the inner cylindrical portion of the collet holder is continuously arranged from the inner opening end of the communication hole of the collet holder toward the through-holes of the rear end surface of the tool, the spatial volume of the flow path can be reduced. Accordingly, even when the liquefied cutting oil is generated inside the flow path, the cutting oil can be inhibited from being stored inside the flow path.

According to a third aspect of the present invention, in the working unit, the inner cylindrical portion may be provided with a connector connecting the collet holder and a spindle in a step portion, and a rubber member firmly fixed to the connector or the flow path guide plug may be provided between the connector and the flow path guide plug.

According to such a configuration, because the rubber member is interposed between the connector and the flow path guide plug, the space inside the inner cylindrical portion can be reduced, and formation of unnecessary internal space inside the flow path can be suppressed. Also, the tool is inserted to the inner cylindrical portion of the collet holder in the axial direction with the flow path guide plug and the rubber member being interposed in between, and is elastically supported. Therefore, deterioration of centering accuracy of the tool caused by drawing in of the collet and the tool in fastening a collet nut can be prevented by the rubber member.

According to a fourth aspect of the present invention related, in the working unit, the collet holder may be provided with a positioning pin for aligning the position of the communication hole formed in the collet holder and the position of the mist supply path formed in the flow path guide plug.

According to such a configuration, because the position of the communication hole and the position of the mist supply path are aligned with each other by the positioning pin and the flow path guide plug is fixed to the rotational direction of the collet holder, positions of the both can easily agree with each other, and misalignment of the both can be eliminated.

In the working unit, according to a fifth aspect of the present invention, an inside diameter of the mist supply path may be 1-3 mm.

According to such a configuration, because the inside diameter of the mist supply path is formed to be 1-3 mm, change of the spatial volume of the flow path of the mist can be reduced, the foggy state of the mist is maintained, and the mist can be prevented from being liquefied.

According to a sixth aspect of the present invention, in the working unit, the forward and backward moving mechanism may be formed of an air cylinder mechanism driven by air supplied from an compressed air supply source, the spindle motor may be formed of an air motor driven by air supplied from the compressed air supply source, and the air supply section may be supplied with air supplied from the compressed air supply source.

According to such a configuration, because the forward and backward moving mechanism, the spindle motor and the air supply section utilize the air supplied from a same compressed air supply source, the number of the supply source (drive source) can be minimized, and the overall unit can be driven only by air. Accordingly, even in an inconvenient place where a power source is not available, the unit can be driven as far as there is a compressed air supply source. Also, because the forward and backward moving mechanism, the spindle motor and the air supply section are driven by single power source, the number of parts and assembling manpower can be reduced and the structure can be simplified, which can contribute to miniaturization of the overall unit and cost reduction.

According to a seventh aspect of the present invention, in the working unit, a flow rate adjusting section adjusting the flow rate of the air supplied to the mist supply portion and the cutting oil may be further included.

According to such a configuration, because the mist mixing portion has the flow rate adjusting section adjusting the flow rate of the air and the cutting oil, the flow rate of the air can be adjusted, therefore the event that the cutting oil cannot be ejected from the communication hole can be prevented, and only the air can be supplied to the flow path so as to blow off the cutting oil stored inside to the outside.

According to the working unit, working device in relation with the present invention, the mist of the excellent quality can be ejected from the tip of the tool.

BRIEF DESCRIPTION OF THE DRAWINGS

Embodiments of the present invention will be described in detail based on the following figures, wherein:

FIG. 4A and FIG. 4B are drawings showing the mist mixing portion of the drilling unit in relation with an embodiment of the present invention in which FIG. 4A is an essential part enlarged schematic drawing showing a normal state, whereas FIG. 4B is an essential part enlarged schematic drawing showing a state when the cutting oil flows backward;

FIG. 5 is an essential part cross-sectional view showing the holding section of the drilling unit in relation with an embodiment of the present invention;

FIG. 8A and FIG. 8B are drawings showing the drilling unit in relation with an embodiment of the present invention in which FIG. 8A is an essential part enlarged cross-sectional view showing the positional relation of the flow path guide plug and the drill, and FIG. 8B is a schematic drawing showing the through-holes of the nozzle.

DETAILED DESCRIPTION OF PREFERRED EMBODIMENTS

Hereinafter, a working unit 1 in relation with an embodiment of the present invention will be described with reference to the accompanying drawings.

In this connection, the tool can be one that works a workpiece (not shown) by rotation, and a case in which a drill T is employed will be described below as an example. Also, the working unit 1 according to an embodiment of the prevention shown in FIG. 1 is a unit working the workpiece by rotating and moving forward and backward (reciprocating) the drill T utilizing a drive force of the hydraulic pressure, pneumatic pressure, an electric motor and the like, which will be described below referring to a drilling unit 1A rotating and moving forward and backward (reciprocating) the drill T by compressed air as an example.

Further, for the sake of convenience, with reference to the state in which the grip 1a is held by an operator, the side on which the drill T is mounted will be referred to as the front side (leading end side), and the side opposite thereof will be referred to as the rear side, the side to which the grip 1a is fixed will be referred to as the lower side, and the side opposite thereof will be referred to as the upper side.

{Constitution of Drilling Unit}

Figure 1:
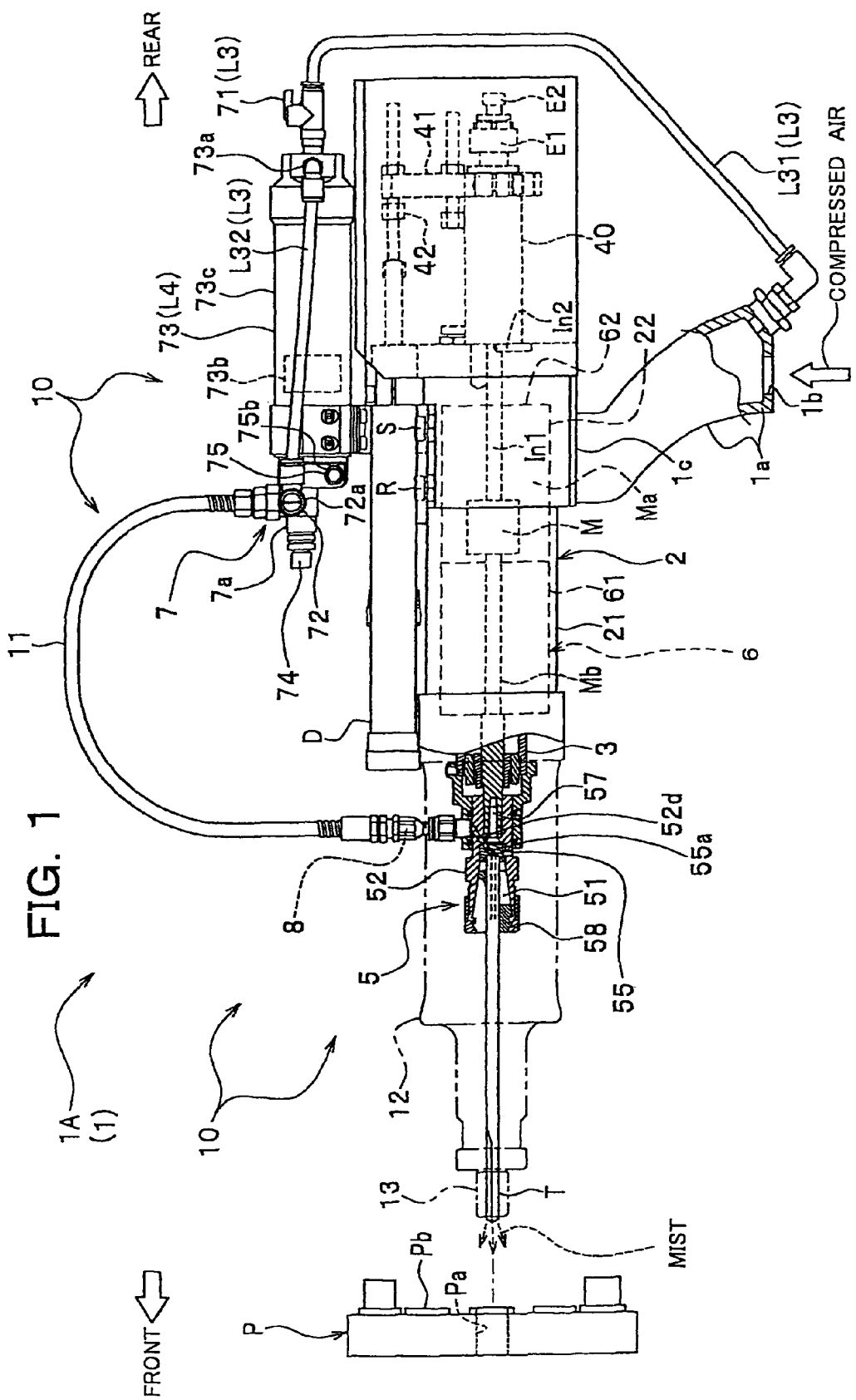
FIG. 1 is a schematic side view with a partial cross-section showing an example of the working unit in relation with an embodiment of the present invention.

As shown in FIG. 1, the drilling unit 1A (working unit 1) is a hand tool with which an operator (not shown) inserts a bush 13 into a positioning bush Pa formed in a jig plate P for positioning while holding the grip 1a, locks the bush 13 by a locking screw Pb, and thereby performs drilling work. The drilling unit 1A is a side-through type unit with which the drill T is rotated while the mist generated in a mist mixing portion 8 is supplied to the workpiece (not shown), a feed is given, and drilling is performed.

The drilling unit 1A mainly includes a generally cylindrical body 2, a ram 3 internally equipped in the body 2 so as to move forward and backward, a center bar 40 having an exhaust port E1 in the rear portion of the ram 3, a forward and backward moving mechanism 6 moving the ram 3 forward and backward, the drill T, a holding section 5 holding the drill T and moving forward and backward integrally with the ram 3, a spindle motor M rotating the holding section 5, a mist supply portion 10 supplying foggy mist generated by mixing the cutting oil and the compressed air to the drill T, a nose piece 12 disposed in the front portion of the body 2 to cover the drill T, and a bush 13 mounted in the leading end portion of the nose piece 12 and guiding the tip of the drill T.

{Constitution of Body}

The body 2 shown in FIG. 1 is a housing in which the ram 3 moving reciprocally (feed and return movement), the forward and backward moving mechanism 6, the spindle motor M and the like are internally equipped. The body 2 is formed by connecting a front body 21 in which a first cylinder chamber 61 retracting the ram 3 by the compressed air from a retracting flow path L21 (refer to FIG. 3) is internally arranged and a rear body 22 in which a second cylinder chamber 62 advancing the ram 3 by the compressed air from an advancing flow path L22 (refer to FIG. 3) is internally arranged. A hydraulic damper D is mounted in the upper portion of the body 2. The grip 1a having an air supply port 1b communicating with an air pressure chamber 1c formed in the outer peripheral portion of the ram 3 is fixed to the lower portion of the body 2.

In the air pressure chamber 1c, the compressed air introduced from the air supply port 1b through a motor flow path L11 (refer to FIG. 3) is temporarily stored, and when the ram 3 initiates feed motion and advances to allow an inlet flow path In2 of the center bar 40 to communicate with the air pressure chamber 1c, the compressed air is supplied to the spindle motor M from the inlet flow path In2 through an inlet flow path In1 to rotate the spindle motor M.

The compressed air supplied to the spindle motor M is discharged to the atmospheric air from an exhaust port E1 through an exhaust flow path (not shown). The exhaust port E1 is provided with an exhaust air throttle valve E2 restricting the exhaust air quantity for adjusting the speed of the spindle motor M.

As shown in FIG. 1, the center bar 40 is formed of a shaft bar member extended so as to be screwed into the rear end portion of the ram 3 to block the rear end portion of the ram 3. The center bar 40 includes the exhaust flow path (not shown), the exhaust port E1, and the motor flow path L11 (refer to FIG. 3). In the center bar 40, an adjust screw 42 is provided through a screw support plate 41.

{Constitution of Ram}

The ram 3 is a generally cylindrical member moving the drill T forward and backward by the compressed air through the holding section 5, and is internally equipped in the body 2 so as to move forward and backward. The ram 3 is slidably supported by the leading end portion, center portion and rear end portion of the body 2 through seal members (not shown). In the ram 3, a flange-shaped enlarged diameter portion (not shown) sliding in the front-rear direction inside the body 2 by the compressed air is formed in the center portion of the outer peripheral portion.

{Constitution of Adjust Screw and Hydraulic Damper}

The adjust screw 42 can adjust the feed rate of the ram 3 by pressing the hydraulic damper D accompanying the advancing movement of the ram 3.

With respect to the hydraulic damper D, two kinds, for example, of a damper adjusting the feed rate of the ram 3 and a damper adjusting the creep speed feed rate in the drilling work are arranged side by side on the body 2.

{Constitution of Forward and Backward Moving Mechanism}

Figure 3:
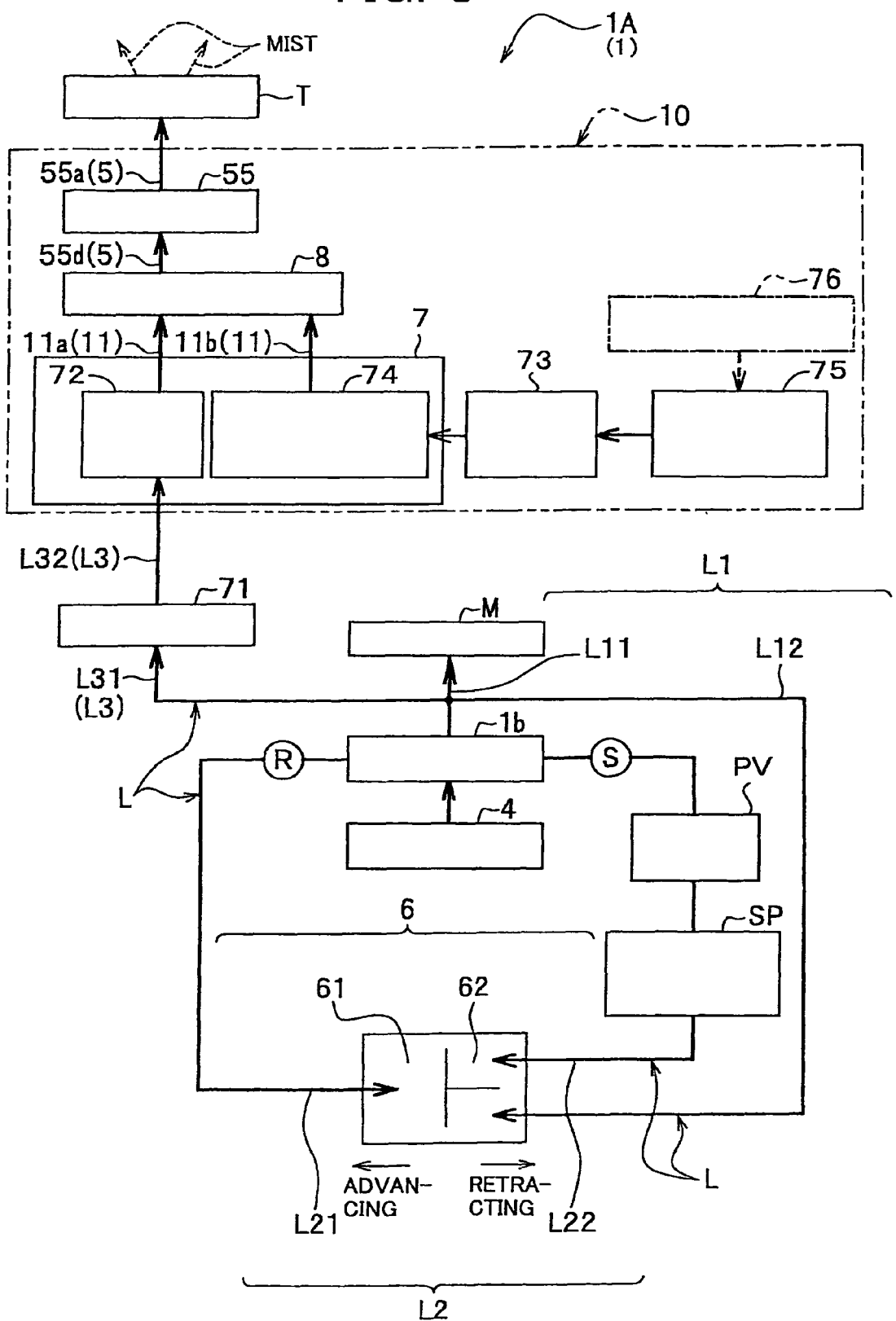
FIG. 3 is a block diagram for illustrating the air flow path of the working unit.

As shown in FIG. 1, the forward and backward moving mechanism 6 is formed, for example, of an air cylinder mechanism making the ram 3, holding section 5, and the drill T advance and retract by the compressed air supplied to the first cylinder chamber 61 or the second cylinder chamber 62 formed between the outer peripheral portion of the ram 3 and the inner peripheral portion of the body 2 from an compressed air supply source 4 through an air flow path L (refer to FIG. 3).

The first cylinder chamber 61 is formed on the front side of the enlarged diameter portion (not shown), and the compressed air for retracting is introduced thereinto through the retracting flow path L21 (refer to FIG. 3) to retract the ram 3. The second cylinder chamber 62 is formed on the rear side of the enlarged diameter portion (not shown), and the compressed air for advancing is introduced thereinto through the advancing flow path L22 (refer to FIG. 3) to advance the ram 3.

{Constitution of Spindle Motor}

The spindle motor M is a motor making the ram 3 rotate the drill T through the holding section 5, and is formed of, for example, an air motor rotated by the compressed air supplied to an air motor chamber Ma from the compressed air supply source 4 (refer to FIG. 3) through the air supply port 1b. A collet 51 and a collet holder 52 of the holding section 5 holding the drill T are connected to the leading end portion of a spindle Mb of the spindle motor M by a flat countersunk head screw 57.

{Constitution of Air Flow Path}

As shown in FIG. 3, an air flow path L is a flow path supplying the compressed air supplied to the air supply port 1b from the compressed air supply source 4 to the drill T and the like through the spindle motor M, the forward and backward moving mechanism 6, and the mist supply portion 10. The air flow path L includes the air supply port 1b communicating with the compressed air supply source 4, a first flow path L1 supplying the compressed air from the air supply port 1b to the spindle motor M and the like, a second flow path L2 supplying the compressed air from the air supply port 1b to the forward and backward moving mechanism 6 and the like, an air for mist supply path L3 supplying the compressed air from the air supply port 1b to a flow rate adjusting portion 7, an air and oil split-flow supply pipe 11 supplying the compressed air from an air flow rate adjusting portion 72 of the flow rate adjusting portion 7 and the cutting oil from a cutting oil quantity adjusting screw portion 74 (oil supply portion) to the mist mixing portion 8 respectively to generate the mist, and a communication hole 52*d* and a mist supply path 55*a* supplying the mist generated in the mist mixing portion 8 to the drill T through the collet holder 52 (not shown) and a flow path guide plug 55.

The air supply port 1*b* is a connection port to which a supply pipe connected to the compressed air supply source 4 arranged outside and supplying the compressed air of approximately 0.5-0.6 MPa is connected, and is formed in the lower end portion of the grip L1 (refer to FIG. 1). The air supply port 1*b* communicates with the first flow path L1, the second flow path L2, and the air for mist supply path L3 respectively.

Further, because the first flow path L1, the second flow path L2, and the air for mist supply path L3 are connected in parallel respectively, adjustment of the speed of the spindle motor M (spindle speed), adjustment of the reciprocating movement speed (feed rate) of the ram 3, and adjustment of the flow rate of the compressed air supplied to the mist mixing portion 8 performed by the air flow rate adjusting portion 72 can be respectively performed independently.

As shown in FIG. 3, the first flow path L1 includes the motor flow path L11 for driving the spindle motor M, a second advancing flow path L12 branched from the motor flow path L11 and advancing the ram 3 (refer to FIG. 1). The motor flow path L11 includes the inlet flow path In1 (refer to FIG. 1) formed in the axial direction from the leading end portion of the center bar 40 and the inlet flow path In2 (refer to FIG. 1) communicating with the inlet flow path In1. The second advancing flow path L12 supplies the compressed air to the rear end portion of the ram 3 (refer to FIG. 1) and advances the ram 3.

The second flow path L2 includes the retracting flow path L21 supplying the compressed air for retracting the ram 3 (refer to FIG. 1), the holding section 5, and the drill T to the first cylinder chamber 61, a return button R for making the compressed air flow through the retracting flow path L21, the advancing flow path L22 supplying the compressed air for advancing the ram 3 (refer to FIG. 1), the holding section 5, and the drill T to the second cylinder chamber 62, a pressure regulator PV arranged in the advancing flow path L22, a pressure compensated flow control valve SP adjusting the flow rate of the compressed air to adjust the advancing and retracting speed of the ram 3 (refer to FIG. 1), the holding section 5, and the drill T, and a start button S for operating the ram.

The pressure regulator PV is mounted behind the grip 1*a* (refer to FIG. 1), and can adjust the advancing thrust of the ram 3 by reducing the pressure of the compressed air. The pressure compensated flow control valve SP can finely adjust the feed rate of quick forward movement of the ram 3.

{Constitution of Mist Supply Portion}

As shown in FIG. 3, the mist supply portion 10 is constituted to include the mist mixing portion 8 generating the mist which is the fog-like mixture of the cutting oil supplied to the drill T and the compressed air, the air supply port 1*b* supplying the compressed air to the mist mixing portion 8 through the air flow path L, an oil supply section (an oil supply pipe 11*b*) supplying the cutting oil to the mist mixing portion 8, an air supply section (an air supply pipe 11*a*) supplying the compressed air to the mist mixing portion 8, a flow rate adjusting section (flow rate adjusting portion 7) adjusting the flow rate of the compressed air and the cutting oil supplied to the mist mixing portion 8, and the communication hole 52*d* and the mist supply path 55*a* supplying the mist to through-holes Tc (refer to FIG. 5) of the drill T.

{Constitution of Air for Mist Supply Portion}

As shown in FIG. 1 and FIG. 3, the air for mist supply path L3 is an air supply device supplying the compressed air to the mist mixing portion 8. The air for mist supply path L3 includes a first air supply pipe L31 whose upstream side is connected to the air supply port 1*b* and downstream side is connected to a hand valve 71, the hand valve 71 opening/closing the downstream side of the first air supply pipe L31, a second air supply pipe L32 whose upstream side is connected to the hand valve 71 and downstream side is connected to the air flow rate adjusting portion 72, and the air flow rate adjusting portion 72 adjusting the flow rate of the compressed air supplied to the mist mixing portion 8.

{Constitution of Hand Valve}

The hand valve 71 is a manual valve having a opening/closing knob opening and closing the air for mist supply path L3. When the hand valve 71 is opened, the compressed air flows from the air supply port 1*b* to the first air supply pipe L31, the hand valve 71, the second air supply pipe L32, the air flow rate adjusting portion 72, the air and oil split-flow supply pipe 11 and the mist mixing portion 8, is mixed with the cutting oil in the mist mixing portion 8 to become the mist, flows through the communication hole 52*d* inside the holding section 5, the mist supply path 55*a* and the through-holes Tc, and the mist is ejected from the tip of the drill T. When the hand valve 71 is closed, supply of the mist also stops.

{Constitution of Air Flow Rate Adjusting Portion}

As shown in FIG. 1, the air flow rate adjusting portion 72 is constituted to include an air inlet port (not shown) formed on the side surface of a flow rate adjusting portion body 7*a* of the flow rate adjusting portion 7, and an adjusting screw 72*a* (refer to FIG. 2) adjusting the flow rate of the compressed air entering into the flow rate adjusting portion body 7*a* from the air inlet port.

The adjusting screw 72*a* (refer to FIG. 2) is a volume capable of adjusting the flow rate of the compressed air entering the mist mixing portion 8 from the second air supply pipe L32 by turningly adjusting the screwed quantity of screwing with the female thread portion (not shown) formed in the air inlet port.

{Constitution of Oil Supply Portion}

As shown in FIG. 1, an oil supply portion L4 is an oil supply device supplying the cutting oil to the mist mixing portion 8. The oil supply portion L4 includes a cutting oil tank 73 storing the cutting oil, a cutting oil supply port 75 communicating with the cutting oil tank 73, a cutting oil feeder 76 (refer to FIG. 2) supplying the cutting oil from the cutting oil supply port 75 to the cutting oil tank 73, and the cutting oil quantity adjusting screw portion 74 adjusting the flow rate of the cutting oil from the cutting oil tank 73 to the mist mixing portion 8.

As shown in FIG. 1, the cutting oil tank 73 is a generally cylinder-like tank and is attached to the upper portion of the body 2 by an attaching fixture. The cutting oil tank 73 is provided with a branching portion 73*a* supplying the compressed air having passed the hand valve 71 to the cutting oil tank 73 side, a pressurizing piston 73*b* pressurizing the cutting oil by the compressed air taken from the branching portion 73*a*, and a cylindrical tank 73*c* in which the pressurizing piston 73*b* is internally arranged so as to move forward and backward. An opening of the cutting oil tank 73 communicates with the mist mixing portion 8 and the cutting oil supply port 75 to allow the cutting oil to enter and exit.

Figure 2:
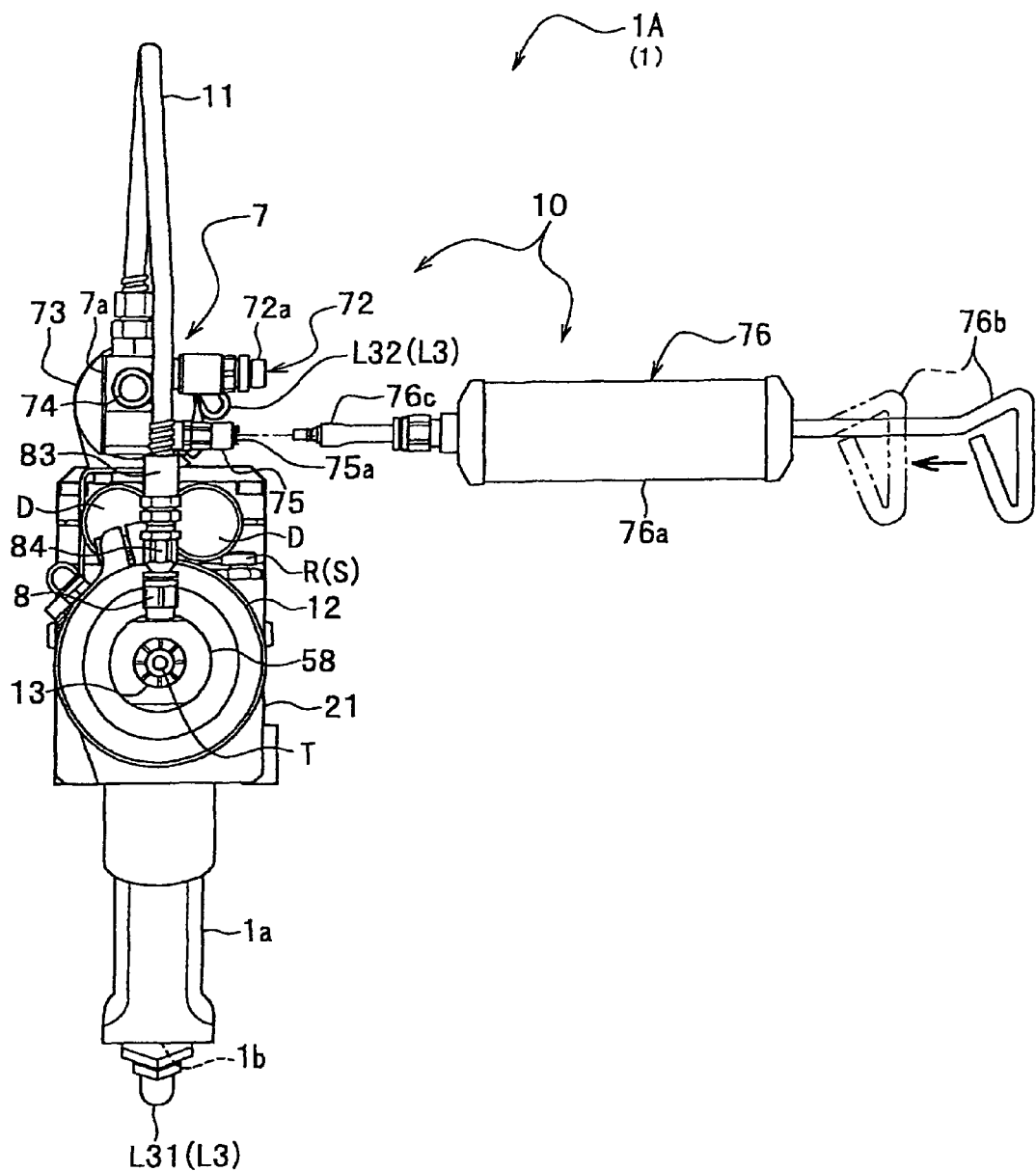
FIG. 2 is a front view showing a use condition of the working unit in relation with an embodiment of the present invention.

As shown in FIG. 2, the cutting oil supply port 75 is constituted so as to connect an injecting connection pipe 76*c* to a supply port 75a to which the cutting oil feeder 76 is connected and a coupler connection port formed in the supply port 75a.

The cutting oil feeder 76 is formed of an oil syringe ejecting the cutting oil to the cutting oil tank 73. The cutting oil feeder 76 includes a cylindrical container 76a containing the cutting oil, a piston rod 76b pushing out the cutting oil inside the container 76a, and the injecting connection pipe 76c whose leading end is internally fitted to the supply port 75a with the base portion communicating with the inner bottom of the container 76a.

{Constitution of Mist Mixing Portion}

As shown in FIG. 4A, the mist mixing portion 8 is a mixing nozzle device generating the mist by mixing the cutting oil and the compressed air. The mist mixing portion 8 is constituted to mainly include an air nozzle 81 ejecting the compressed air, an oil nozzle 82 inserted into the air nozzle 81 and ejecting the cutting oil, an injection pipe 83 shown in FIG. 5, a wheel cap 84 covering the mist mixing portion 8, and a nipple 85 connecting the mist mixing portion 8 with a coolant cover 56.

{Constitution of Holding Section}

The holding section 5 is a section holding the drill T and forming a flow path supplying the mist generated in the mist mixing portion 8 to the drill T. The holding section 5 is constituted to mainly include the coolant cover 56, the collet 51 holding the drill T, the collet holder 52 having an inner cylindrical portion 52a having a stepped cylinder shape to which the collet 51 and the flow path guide plug 55 are internally fitted and formed with the communication hole 52d through which the mist supplied from the mist supply portion 10 is introduced from the inner cylindrical portion 52a to the outer peripheral portion, the flow path guide plug 55 formed with the mist supply path 55a through which the mist flows, the flat countersunk head screw 57 connecting the collet holder 52 with the spindle Mb, a collet nut 58 fixing the collet 51 to the collet holder 52, and a positioning pin 92 fixing the flow path guide plug 55 at a predetermined position inside the collet holder 52.

{Constitution of Coolant Cover}

As shown in FIG. 5, the coolant cover 56 is a member making the mist mixing portion 8 communicate with the communication hole 52d formed in the collet holder 52. The coolant cover 56 is formed of a member of a stepped cylinder shape composed of a small diameter portion and a large diameter portion. In the coolant cover 56, a connection portion 56a to which a leading end side connection portion 8a of the mist mixing portion 8 is connected and formed in a position agreeing with the position of the communication hole 52d, and annular grooves 56b, 56c into which O rings O1, O2 arranged apart from each other in the axial direction with respect to the connection portion 56a are fitted are formed.

Figure 6:
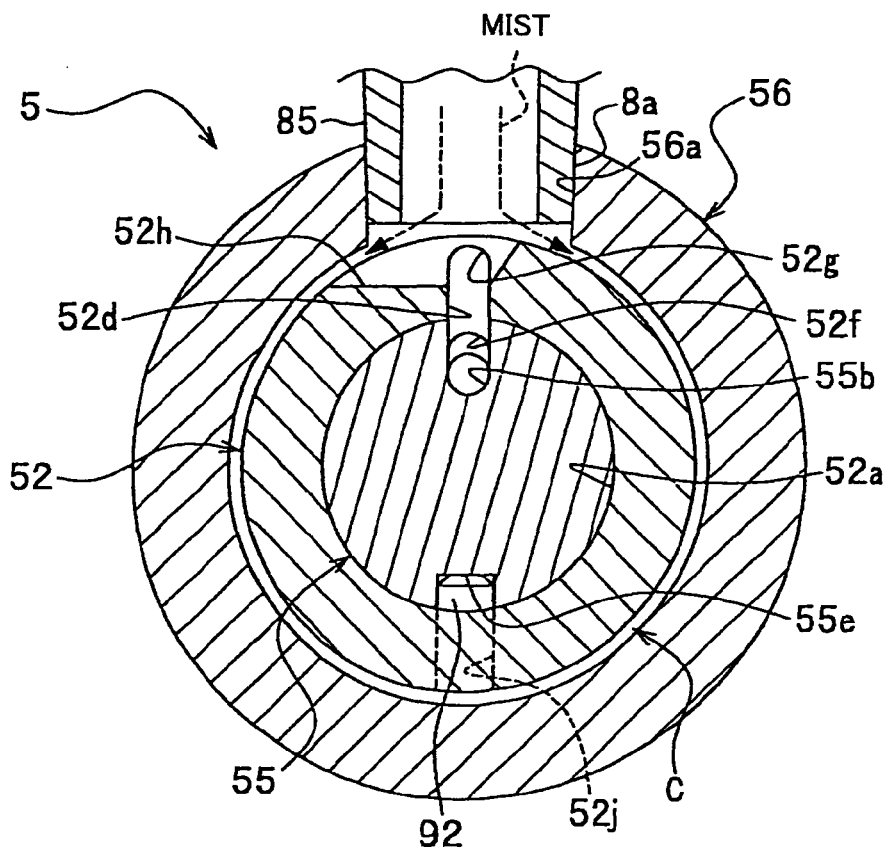
FIG. 6 is a cross-sectional view taken along the line X-X in FIG. 5.

As shown in FIG. 5 and FIG. 6, there is a small gap C between the inner wall surface of the coolant cover 56 and the outer peripheral surface of the collet holder 52 between the O rings O1 and O2, however two O rings O1, O2 are configured to prevent the mist from leaking to the outside. The coolant cover 56 is fixed to the ram 3 by a setscrew. Therefore the coolant cover 56 moves forward and backward integrally with the ram 3.

As shown in FIG. 6, the gap C is a ring-like space formed between the inner wall surface of the coolant cover 56 and the outer peripheral surface of the collet holder 52 rotating integrally with the spindle Mb, and communicates with the mist mixing portion 8 and the communication hole 52d at all time. Therefore, the gap C acts as a means of escape by relaxing instantaneous rise of the flowing resistance of the mist caused because the mist supplied from the mist mixing portion 8 escapes threinto when the communication hole 52d shifts from the position of the pipeline inside the leading end side connection portion 8a of the mist mixing portion 8 at the time the collet holder 52 rotates. As a result of it, the mist can be prevented from colliding with the wall surface of the flow path and being liquefied in the gap between the leading end side connection portion 8a of the mist mixing portion 8 and the communication hole 52d.

Also, because the gap C is formed between the inner wall surface of the coolant cover 56 and the outer peripheral surface of the collet holder 52, the space becomes of a non-contact state, therefore the frictional resistance is reduced and rotation of the collet holder 52 becomes excellent.

{Constitution of Collet and Collet Nut}

As shown in FIG. 5, the collet 51 is a generally cylindrical member to which a rear end surface Tb side of the drill T is attached and has a taper portion internally fitted to an expansion portion 52k expandingly formed in the inner cylindrical portion 52a of the collet holder 52 on the outer peripheral surface. The collet 51 is provided with a plurality of slots 51a to facilitate elastic deformation of the collet 51 in the radial direction and a drill holding hole 51b into which the drill T is inserted.

The collet nut 58 is a fixture fixing the collet 51 to the collet holder 52, and has a female thread portion (not shown) screwed with a male thread portion 52i of the collet holder 52 in a state the head portion of the collet 51 is internally fitted.

{Constitution of Collet Holder}

As shown in FIG. 5, the collet holder 52 is a generally cylindrical member forming the main body of the holding section 5 and formed with a supply path supplying the mist supplied through the nipple 85 to the through-holes Tc of the drill T inside. The collet holder 52 is formed with the inner cylindrical portion 52a in which a front side opening end 52b and a rear side opening end 52c communicate with each other in the axial direction, the communication hole 52d formed diagonal with respect to the axial direction from an outer opening end 52g formed on the outer peripheral surface of the collet holder 52 toward an inner opening end 52f, a step portion 52e formed in a step shape by narrowing the diameter in the generally central portion inside the inner cylindrical portion 52a, the male thread portion 52i, and a pin mounting hole 52j in which the positioning pin 92 is mounted.

The collet holder 52 is configured that the mist is supplied to the outer opening end 52g of the communication hole 52d, passes through the through-holes Tc of the drill T via the mist supply path 55a formed in the flow path guide plug 55 inside the collet holder 52, and is supplied to a working portion from a cutting edge.

Figure 8:
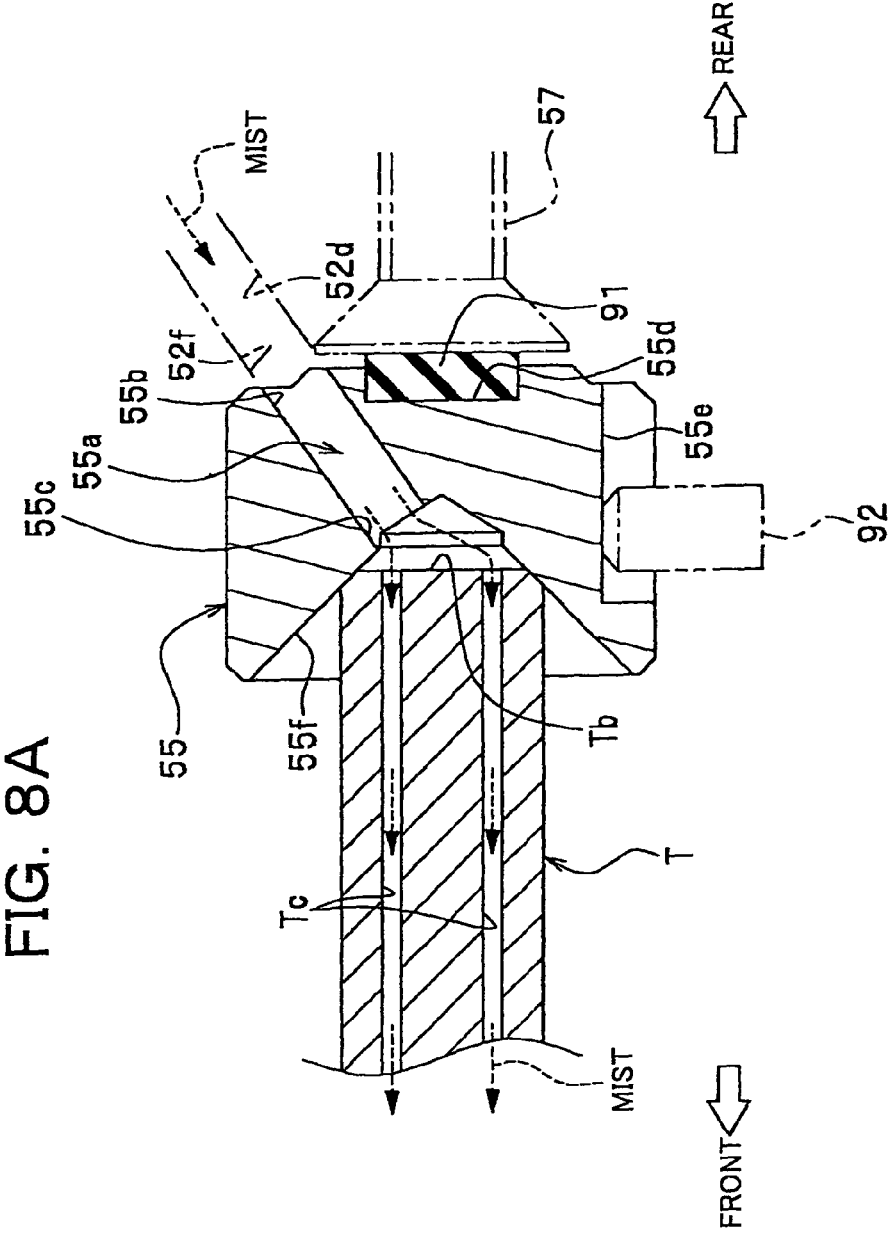

Into the inner cylindrical portion 52a, starting from the step portion 52e toward the front side, the flow path guide plug 55 provided with a rubber member 91 and the collet 51 mounted with the drill T are inserted in this order. As shown in FIG. 8A, the mist supply path 55a of the flow path guide plug 55 internally fitted to the inner cylindrical portion 52a (refer to FIG. 5) is arranged in a state formed from the inner opening end 52f of the communication hole 52d toward the through-holes Tc on the rear end surface Tb of the drill T. As shown in FIG. 5, the front end portion of the spindle Mb is inserted into the rear side of the inner cylindrical portion 52a, and the spindle Mb is fixed to the collet holder 52 by the flat countersunk head screw 57 (fastener). In the step portion 52e, the inner opening end 52f of the communication hole 52d opens, and the head portion of the flat countersunk head screw 57 (fastener) is attached.

{Constitution of Flat Countersunk Head Screw}

As shown in FIG. 5 and FIG. 8A, the flat countersunk head screw 57 is arranged so as to engage with the step portion 52e and to block the inner cylindrical portion 52a in order not to be a state the head portion of the flat countersunk head screw 57 projects forward from the step portion 52e inside the inner cylindrical portion 52a. The rubber member 91 is arranged between the flat countersunk head screw 57 and the flow path guide plug 55 in a state securely sticking with each other. In this case, the rubber member 91 is firmly adhered by rubber-baking to a recess portion 55d formed on the rear end surface of the flow path guide plug 55 in a state abutting upon the head portion of the flat countersunk head screw 57, however it may be firmly adhered to the head portion of the flat countersunk head screw 57.

{Constitution of Positioning Pin}

The positioning pin 92 is inserted into a pin mounting hole 52j, and its tip engages with a keyway-like positioning portion 55e formed on the outer peripheral surface of the flow path guide plug 55, and thereby the position of the communication hole 52d of the collet holder 52 and the position of the mist supply path 55a of the flow path guide plug 55 are aligned with each other so as to form a diagonal straight line.

{Constitution of Communication Hole}

Figure 7:
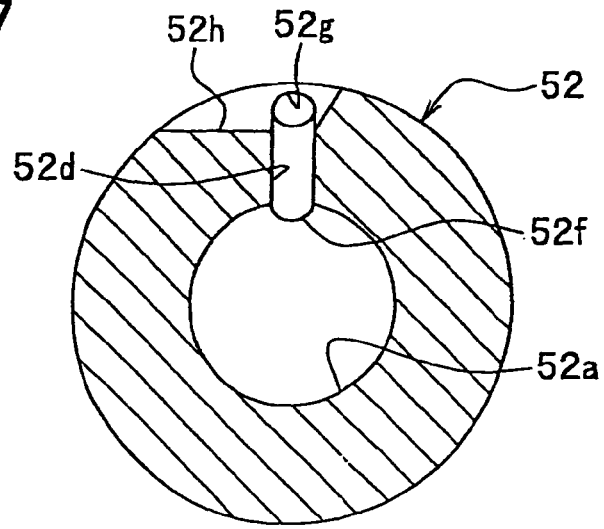
FIG. 7 is an essential part enlarged cross-sectional view showing the communication hole of the collet holder of the drilling unit in relation with an embodiment of the present invention.

As shown in FIG. 5, the communication hole 52d is formed diagonal with respect to the axial direction from the outer opening end 52g of the collet holder 52 to which the mist is supplied toward the inner opening end 52f side. As shown in FIG. 7, in the communication hole 52d, the outer opening end 52g opens to an oil pocket 52h notched and formed on the outer peripheral surface of the collet holder 52. As shown in FIG. 8A, the inner opening end 52f of the communication hole 52d is arranged in a state agreeing with an upstream side opening end 55b of the flow path guide plug, 55 on a same straight line, and is arranged in the continuous state to allow smooth flow of the mist.

{Constitution of Flow Path Guide Plug}

As shown in FIG. 5, the flow path guide plug 55 is a generally cylindrical member having the mist supply path 55a drilled diagonal with respect to the axial direction and internally fitted to the inner cylindrical portion 52a. As shown in FIG. 8A, the flow path guide plug 55 is arranged so that the mist entering the outer opening end 52g (refer to FIG. 5 and FIG. 7) of the communication hole 52d continuously flows from the communication hole 52d to the through-holes Tc of the drill T through the mist supply path 55a.

In other words, the mist supply path 55a is formed so that a portion of the mist supply path 55a from the upstream side opening end 55b to a downstream side opening end 55c is formed diagonal with respect to the axial direction toward the through-holes Tc on the rear end surface Tb of the drill T, and that the mist entering the upstream side opening end 55b flows straight toward the through-holes Tc. Also, the mist supply path 55a and the communication hole 52d are arranged so as to form a straight line toward the through-holes Tc, and this state is maintained by the positioning pin 92.

The inside diameter of the mist supply path 55a of the flow path guide plug 55 is formed to be 1-3 mm, preferably 1.5-2 mm, and more preferably 2 mm.

Also, the inside diameter of the mist supply path 55a is not limited to the above-mentioned figures, and may be of appropriate dimension according to the working diameter and the inside diameter of the oil hole of the drill T. For example, when the working inside diameter is 5-16 mm, the inside diameter of the oil hole of the drill T that works is basically 0.6-1.7 mm ($1/10$ of the working diameter plus 0.1 mm).

{Constitution of Nose Piece, Bush, and Drill}

As shown in FIG. 1, the nose piece 12 is a cover member disposed in the front portion of the body 2 and covering the holding section 5 and the rear end portion side of the drill T.

The bush 13 is a cylindrical member attached to the leading end portion of the nose piece 12 and supporting the drill T.

As shown in FIG. 5 and FIG. 8B, the drill T is a tool working a workpiece, and has a plurality of the through-holes Tc through which the mist or the compressed air flows extending from the cutting blade portion of a front end surface Ta to the rear end surface Tb.

[Action]

The motion of the drilling unit 1A in relation with the present embodiment constituted as described above will be described referring to a reference shown in FIG. 9.

{Reference}

Figure 9:
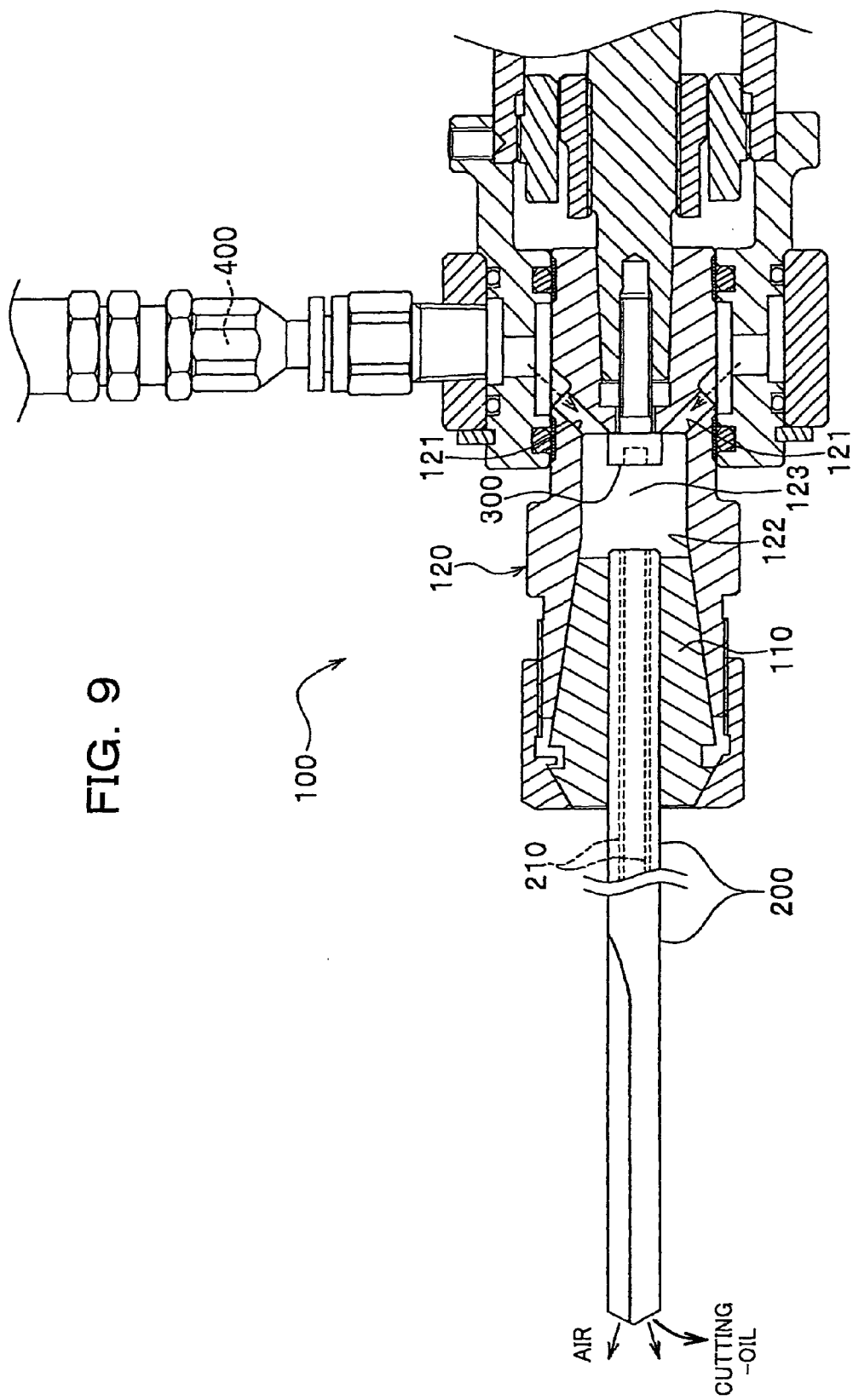
FIG. 9 is an essential part enlarged cross-sectional view showing a reference of the present invention.

FIG. 9 is an essential part enlarged cross-sectional view showing a reference of the present invention. First, the reference will be described referring to FIG. 9.

As shown in FIG. 9, a drilling unit 100 of the reference is equipped with a collet 110 holding a drill 200 so as to form a large inner space 123 in an inner cylindrical portion 122 inside a collet holder 120. In the inner space 123, a head portion of a hexagon socket head cap bolt 300 for fixing a spindle is arranged in a state projecting from the inner wall surface. On the outer peripheral surface of the collet holder 120, four communication holes 121 in a straight shape through which the mist is supplied from a mist mixing portion 400 are formed, and communicate with the inner space 123.

Using the drilling unit 100 constituted as described above, an experiment was conducted in which the mist generated in the mist mixing portion 400 was supplied to through-holes 210 of the drill 200 from the four communication holes 121 through the inner space 123. Then, the foggy mist was not ejected from the tip of the drill 200, and only the compressed air was ejected. Also, because the flow path area of the four communication holes 121 in a straight shape and the inner space 123 was wide and the head portion of the hexagon socket head cap bolt 300 projected into the flow path, the mist collided with the head portion, and as a result of it, the mist was stored in a liquefied state, and occasionally, the cutting oil was discharged successively from the tip of the drill 200.

{Action According to the Present Invention}

The present invention is a modification of the reference allowing excellent mist to be ejected from the tip of the drill T. Its action will be described below.

In the drilling unit 1A in relation with the present embodiment, as shown in FIG. 1, when the start button S is pressed, the compressed air supplied to the air supply port 1b from the compressed air supply source 4 passes the advancing flow path L22 shown in FIG. 3 and is supplied to the second cylinder chamber 62 of the forward and backward moving mechanism 6 and the spindle motor M through the pressure regulator PV and the pressure compensated flow control valve SP, the forward and backward moving mechanism 6 advances, and the spindle motor M rotates.

When the ram 3 shown in FIG. 1 advances to a position where the inlet flow path 1n2 and the air pressure chamber 1c communicate with each other, the compressed air is supplied to the spindle motor M through the inlet flow path In2 and the inlet flow path In1, and the spindle motor M rotates. Thus, the feed is given to perform drilling while the drill T is rotated.

Also, when the hand valve 71 is opened, the compressed air flows from the air supply port 1b to the first air supply pipe L31, the hand valve 71, the second air supply pipe L32, the air flow rate adjusting portion 72, the air and oil split-flow supply pipe 11, and the mist mixing portion 8, is mixed with the cutting oil in the mist mixing portion 8 to be formed into the mist, flows through the communication hole 52*d*, the mist supply path 55*a*, and the through-holes Tc, and the mist is ejected from the tip of the drill T.

As shown in FIG. 5, the communication hole 52*d* and the mist supply path 55*a* formed in an equal diameter are arranged on one diagonal straight line from the outer opening end 52*g* of the outer peripheral portion of the collet holder 52 toward the through-holes Tc of the drill T existing in the direction of the axis through the downstream side opening end 55*c*, and therefore the mist generated in the mist mixing portion 8 flows so as to smoothly enter the through-holes Tc. Thus, the mist is allowed to flow straight linearly via the shortest distance, and collision with the wall surface and the like inside the flow path is eliminated, and the flowing resistance is small. As a result of it, liquefying of the mist can be eliminated.

Further, when the flow path guide plug 55 is to be assembled to the collet holder 52, as shown in FIG. 5 and FIG. 8A, the flow path guide plug 55 is internally fitted to the inner cylindrical portion 52*a* of the collet holder 52 having one communication hole 52*d* with the mist supply path 55*a* side up and the pin mounting hole 52*j* side down in a state the rear end surface Tb of the drill T abuts upon an enlarged diameter surface 55*f* of the flow path guide plug 55, and the state is maintained by engaging the positioning pin 92 with the pin mounting hole 52*j*. Then the communication hole 52*d* and the mist supply path 55*a* agree with each other, and a generally pipe-like continuous flow path is formed.

Accordingly, the flow path volume of the flow path through which the mist flows from the communication hole 52*d* as far as the through-holes Tc of the drill T through the mist supply path 55*a* is less than the flow path volume in the reference. As a result of it, the mist smoothly flows toward the mist supply path 55*a* and the through-holes Tc without being temporarily stored inside the flow path guide plug 55 and without colliding with the wall surface and the like, the flowing resistance is small, and therefore the mist is not liquefied.

Because the front end surface Ta of the drill T is arranged so as to abut upon the tapered opening portion of the flow path guide plug 55, the mist ejected from the mist supply path 55*a* is ejected so as to be introduced into the through-holes Tc. Also, as shown in FIG. 88, because the pitch distance d of the through-holes Tc of the drill T is narrow, the mist having passed the mist supply path 55*a* of the flow path guide plug 55 enters the through-holes Tc easily. As a result of it, the mist is ejected from a front end surface Ta of the drill T in an excellent mist state.

Also, when the cutting oil is stored in the mist supply path 55*a* inside the holding section 5, the cutting oil quantity adjusting screw portion 74 is operated to stop the flow of the cutting oil and to supply only the compressed air, thereby, as shown in FIG. 4B, the cutting oil present in the mist mixing portion 8 can be made flow backward into the oil supply pipe 11*b*, and the cutting oil stored inside the flow path can be blown off to the downstream side by the ejected air to allow to be discharged to the outside from the tip of the drill T.

On the other hand, when the return button R is pressed, the compressed air is supplied from the compressed air supply source 4 to the first cylinder chamber 61 of the forward and backward moving mechanism 6 through the retracting flow path L21 (refer to FIG. 3) via the air supply path 1*b*, and the ram 3 retracts. When the ram 3 retracts further beyond the position where the inlet flow path In2 and the air pressure chamber 1*c* communicate with each other, communication of the inlet flow path 1*n*2 and the air pressure chamber 1*c* is intercepted thereby, supply of the compressed air to the spindle motor M is stopped, and therefore the motor M stops.

Also, the return button R retracts during an advancing motion in the manual motion. Further in the auto-return motion, the return button R automatically retracts when the ram 3 reaches a predetermined advance end.

In addition, the present invention is not limited to the above-mentioned embodiments, a variety of modifications and alterations are possible within the scope of its technical thought, and it will be needless to mention that the present invention covers such modified and altered invention.

For example, with respect to a working unit 1 having a reciprocally moving body, an embodiment of the present invention was described citing a case of feeding the ram 3 of such a drilling unit as shown in FIG. 1 as an example, however the present invention is not limited to it and can be applicable as far as a machine has a reciprocally moving body that moves forward and backward, and other type of units will do.

The working unit 1 can be a machine equipped with a reciprocally moving body such as the ram 3 and the like that moves forward and backward, or can be a machine mounted with the ram 3 moving an object such as a tool and a workpiece forward and backward, and what activates the reciprocally moving ram 3 and for which application the working unit is used are not specifically limited.

That is to say, the spindle motor M can be of any type as far as it rotates the ram 3, the holding section 5 and the drill T, and it can be a hydraulic motor, electric motor and the like for example.

Also, the forward and backward moving mechanism 6 can be of any type as far as it is a device moving the ram 3, the holding section 5 and the drill T forward and backward, and can be of a type employing other type of mechanism such as a hydraulic cylinder mechanism, a motorized gear mechanism and the like.

Although the above-mentioned embodiment was described citing the drill T as an example of the tool, other types of tools are applicable as far as they work a workpiece by rotating and reciprocally moving a rotary tool such as a tap, reamer, end mill, and the like.

What is claimed is:
1. A working device for working a workpiece using mist for working, the working device comprising:
   a generally cylindrical body having a longtudinal axis;
   a ram provided inside the body so that the ram can move forward and backward therein in a direction of the longitudinal axis;
   a forward and backward moving mechanism moving the ram forward and backward in the direction of t axis;
   a tool for working the workpiece;
   a holding section holding the tool and moving forward and backward integrally with the ram;
   a spindle motor rotating the holding section about the longtudinal axis; and
   a mist supply portion supplying foggy mist generated by mixing air from an air supply section supplying the air and cutting oil from an oil supply section supplying the cutting oil to the tool, wherein:
     the tool has through-holes supplying the mist to a cutting blade portion of the tool;
     the holding section includes a collet holding the tool and a collet holder having an inner cylindrical portion into which the collet is inserted, the collet holder having a communication hole to which the mist supplied from the mist supply portion is introduced, the communi- cation hole being formed from the inner cylindrical portion to an outer peripheral portion of the collet holder;

a flow path guide plug having a mist supply path formed from an inner opening end of the communication hole toward the through-holes of the rear end surface of the tool is internally fitted to the inner cylindrical portion;

the communication hole is formed diagonally with respect to the direction of the longitudinal axis from an outer opening end formed on the outer peripheral portion of the collet holder toward the inner opening end;

the mist supply path is formed diagonally with respect to the direction of the longitudinal axis through an upstream side opening end of the flow path guide plug and a downstream opening end of the flow path guide plug toward the through-holes of the rear end surface of the tool;

the flow path guide plug is arranged so that the mist having entered an outer opening end continuously flows from the communication hole to the through-holes of the tool through the mist supply path; and the collet holder is provide with a position pin for aligning a position of the communication hole formed in the collet holder and a position of the mist supply path formed in the flow path guide plug so as to form a diagonal straight line relative to the direction of the longitudinal axis.

2. The working device according to claim 1, wherein:
the inner cylindrical portion is provided with a connector connecting the collet holder and a spindle in a step portion; and
a rubber member firmly fixed to the connector or the flow path guide plug is provided between the connector and the flow path guide plug.

3. The working device according to claim 1, wherein an inside diameter of the mist supply path is 1-3 mm.

4. The working device according to claim 1, wherein:
the forward and backward moving mechanism is formed of an air cylinder mechanism driven by air supplied from a compressed air supply source;
the spindle motor is formed of an air motor driven by air supplied from the compressed air supply source; and
the air supply section is supplied with air supplied from the compressed air supply source.

5. The working device according to claim 1, further comprising a flow rate adjusting section adjusting the flow rate of the air supplied to the mist supply portion and the cutting oil.

6. The working device according to claim 1, wherein the positioning pin is configured to rotatably fix the flow path guide plug relative to the collet holder.

7. The working device according to claim 1, wherein the flow path guide plug includes a mounting hole configured to receive the positioning pin.

* * * * *